(12) United States Patent
Okugawa et al.

(10) Patent No.: US 7,231,761 B2
(45) Date of Patent: Jun. 19, 2007

(54) EXHAUST GAS PURIFICATION SYSTEM OF INTERNAL COMBUSTION ENGINE

(75) Inventors: Shinichiro Okugawa, Toyota (JP); Kazuo Kojima, Nagoya (JP); Hiroshi Haraguchi, Kariya (JP)

(73) Assignee: Denso Corporation, Kariya (JP)

( * ) Notice: Subject to any disclaimer, the term of this patent is extended or adjusted under 35 U.S.C. 154(b) by 17 days.

(21) Appl. No.: 11/097,249

(22) Filed: Apr. 4, 2005

(65) Prior Publication Data

US 2005/0217256 A1    Oct. 6, 2005

(30) Foreign Application Priority Data

Apr. 5, 2004   (JP)   ............................ 2004-111189
Feb. 24, 2005  (JP)   ............................ 2005-048292

(51) Int. Cl.
  *F01N 3/00*   (2006.01)
  *F01N 3/02*   (2006.01)
(52) U.S. Cl. .............................. 60/295; 60/297; 60/311
(58) Field of Classification Search .................. 60/295, 60/297, 311, 284
  See application file for complete search history.

(56) References Cited

U.S. PATENT DOCUMENTS

| | | | |
|---|---|---|---|
| 6,558,637 B2 * | 5/2003 | Tamura et al. | 422/186.04 |
| 6,622,480 B2 * | 9/2003 | Tashiro et al. | 60/295 |
| 6,862,880 B2 * | 3/2005 | Schnaibel et al. | 60/295 |
| 6,931,842 B2 * | 8/2005 | Ohtake et al. | 60/295 |
| 7,076,944 B2 * | 7/2006 | Okugawa et al. | 60/295 |
| 2004/0123586 A1 * | 7/2004 | Kuboshima et al. | 60/277 |
| 2004/0159099 A1 * | 8/2004 | Kuboshima et al. | 60/297 |
| 2004/0187480 A1 * | 9/2004 | Bidner et al. | 60/285 |
| 2004/0194450 A1 * | 10/2004 | Tanaka et al. | 60/285 |
| 2004/0226288 A1 * | 11/2004 | Okugawa et al. | 60/295 |
| 2005/0198945 A1 * | 9/2005 | Okugawa et al. | 60/295 |
| 2005/0241301 A1 * | 11/2005 | Okugawa et al. | 60/295 |
| 2006/0075740 A1 * | 4/2006 | Twigg et al. | 60/285 |

FOREIGN PATENT DOCUMENTS

JP    2003-172185    6/2003

* cited by examiner

*Primary Examiner*—Thomas Denion
*Assistant Examiner*—Loren Edwards
(74) *Attorney, Agent, or Firm*—Nixon & Vanderhye PC

(57) ABSTRACT

An electronic control unit of an internal combustion engine calculates a basic post-injection quantity of temperature increasing means if a deposition quantity of particulate matters deposited on a diesel particulate filter (DPF) exceeds a predetermined value. Then, a final post-injection quantity is calculated by correcting the basic post-injection quantity based on a temperature correction value, which is calculated by multiplying a deviation between DPF upstream exhaust gas temperature and target temperature and past temperature correction values by feedback gains. The feedback gains are switched in accordance with a delay in an exhaust gas temperature change in a present operating state, based on an intake air quantity sensed by an air flow meter. Thus, response can be improved, while maintaining stability.

20 Claims, 12 Drawing Sheets

EXHAUST GAS PURIFICATION SYSTEM OF INTERNAL COMBUSTION ENGINE

CROSS REFERENCE TO RELATED APPLICATION

This application is based on and incorporates herein by reference Japanese Patent Applications No. 2004-111189 filed on Apr. 5, 2004 and No. 2005-48292 filed on Feb. 24, 2005.

BACKGROUND OF THE INVENTION

1. Field of the Invention

The present invention relates to an exhaust gas purification system of an internal combustion engine having a particulate filter in an exhaust passage. Specifically, the present invention relates to temperature increasing control of a particulate filter during regeneration of the particulate filter.

2. Description of Related Art

A known exhaust gas purification system includes a particulate filter (a diesel particulate filter: DPF) for collecting particulate matters (PM) discharged from a diesel engine. The system increases temperature of the DPF, for instance, over 600° C., when a quantity of the particulate matters deposited on the DPF (a PM deposition quantity) reaches a predetermined value. Thus, the particulate matters deposited on the DFF are combusted and eliminated, and the DPF is regenerated.

At that time, a post-injection, retardation of fuel injection timing, restriction of intake air and the like are usually used as means for increasing the temperature of the DPF. However, deterioration in a fuel cost accompanies the above temperature-increasing means. A combustion speed of the particulate matters increases as the temperature increases. Therefore, the regeneration is finished in a shorter period and the deterioration in the fuel cost due to the regeneration of the DPF is reduced as the temperature increases however, the particulate matters are combusted rapidly and the DPF temperature increases rapidly if the DPF temperature is too high. In such a case, there is a possibility that the DPF is damaged or an oxidation catalyst supported by the DPF is degraded. In order to inhibit the deterioration in the fuel cost and to regenerate the DPF safely, temperature control for maintaining the DPF temperature near target temperature suitable for the regeneration is necessary.

Temperature increasing ability of the temperature increasing means has a limitation and varies in accordance with operating states. Therefore, the DPF temperature fluctuates during the regeneration. In operating states such as a low load operation or deceleration operation, the temperature increasing ability becomes insufficient. Accordingly, a sufficient temperature increasing effect cannot be obtained and the DPF temperature decreases largely. Therefore, in order to inhibit the fluctuation of the DPF temperature during the regeneration, an operation amount of the temperature increasing means should be corrected so that the DPF temperature quickly returns to proximity of target temperature.

In exhaust gas temperature feedback control disclosed in JP-A-2003-172185 (Patent Document 1), the operation amount of the temperature increasing means is corrected with a correction value obtained by multiplying a deviation between a predetermined target temperature and exhaust gas temperature sensed by a sensor and the like or an integration value of the deviation by a predetermined feedback gain (F/B gain). Thus, the DPF temperature is maintained near the target temperature suitable for the regeneration.

Generally, a period for the exhaust gas temperature to reach the target temperature THTRG shortens and response of a control system is improved as the F/B gain is increased. However, the temperature vibrates near the target temperature THTRG and stability is deteriorated as the F/B gain is increased. The response is deteriorated and the stability is improved as the F/B gain is decreased. Therefore, the temperature control should be performed by selecting the optimum F/B gain capable of achieving the response and the stability at the same time.

However, the change in the exhaust gas temperature TH delays with respect to the operation amount of the temperature increasing means mainly due to a delay in heat transfer between a base material of the DPF and the exhaust gas. Moreover, the delay in the control object changes due to a change in the operating state. Accordingly, the optimum F/B gain varies as shown by a solid line "a" in FIG. 3A. The solid line "a" in FIG. 3A represents the optimum F/B gain. Therefore, if the F/B gain is a constant value D as shown in FIG. 3A, overshoot increases and the stability is deteriorated as shown by a broken line B in FIG. 3B in an operating state in which the delay is a large value B. In another operating state in which the delay is a small value C, the response is deteriorated as shown by a chained line C in FIG. 3B. In FIG. 3A, the response is improved and the stability is deteriorated along a direction I. In FIG. 3A, the response is deteriorated and the stability is improved along a direction II.

SUMMARY OF THE INVENTION

It is therefore an object of the present invention to achieve stability and response of a control system at the same time by performing feedback control with an optimum feedback gain according to a present operating state in temperature control during regeneration of a diesel particulate filter.

According to an aspect of the present invention, an exhaust gas purification system of an internal combustion engine includes a particulate filter, temperature increasing means, operating state sensing means, temperature sensing means, deposition quantity estimating means and regeneration controlling means. The particulate filter is disposed in an exhaust passage of the engine. The temperature increasing means increases temperature of the particulate filter. The operating state sensing means senses an operating state of the engine. The temperature sensing means senses the temperature of the particulate filter. The deposition quantity estimating means estimates a deposition quantity of particulate matters deposited on the particulate filter. The regeneration controlling means increases the temperature of the particulate filter to proximity of a predetermined target temperature by operating the temperature increasing means when an output of the deposition quantity estimating means exceeds a predetermined value. Thus, the particulate matters deposited on the particulate filter are combusted and eliminated. The regeneration controlling means includes basic operation amount calculating means, feedback gain calculating means, and correction value calculating means. The basic operation amount calculating means calculates a basic operation amount of the temperature increasing means. The feedback gain calculating means calculates a feedback gain corresponding to a delay in a change of exhaust gas temperature with respect to a change of the operation amount of the temperature increasing means based on an output of the operating state sensing means. The correction value calculating means calculates a correction value of the operation amount of the temperature increasing means based on the feedback gain calculated by the feedback gain calculating means and an output of the temperature sensing means.

The change of the exhaust gas temperature delays with respect to the change of the temperature increase operation amount. Moreover, the delay of the control object changes due to the change in the operating state. For instance, if the operating state changes and an exhaust gas flow rate V increases as shown in FIG. 4, heat transfer ratio increases and the delay decreases. Signs QPFIN and TH in FIG. 4 represent a post-injection quantity and the exhaust gas temperature, respectively. A solid line "a", a broken line "b", and a chained line "c" in FIG. 4 show changes of the exhaust gas temperature TH in the case where the exhaust gas flow rate V is normal, large and small respectively. Therefore, the regeneration controlling means of the present invention senses the operating state and recognizes the present delay based on the relationship between the exhaust gas flow rate and the delay determined by the operating state. Thus, the regeneration controlling means calculates the suitable feedback gain corresponding to the present delay. The temperature increase operation amount is corrected by using the feedback gain. Thus, the temperature correction taking the delay into consideration can be performed, and the temperature can be approximated to the target temperature quickly Thus, the suitable F/B gain corresponding to the present operating state is selected to improve the response of the control system and to ensure safety.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS (First Embodiment)

Figure 1:
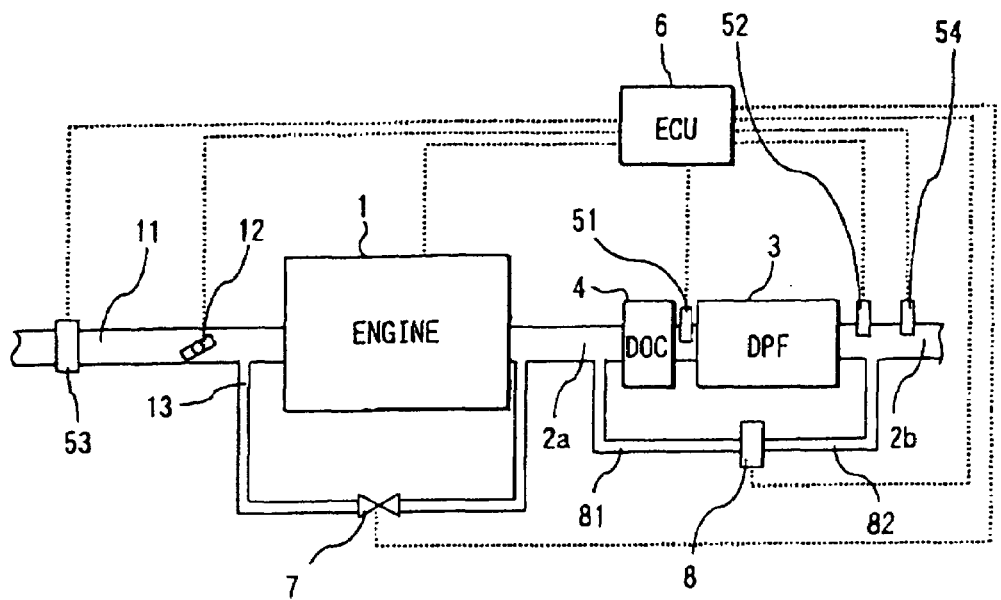
FIG. 1 is a schematic diagram showing an exhaust gas purification system of an internal combustion engine according to a first embodiment of the present invention.

Referring to FIG. 1, an exhaust gas purification system of a diesel engine 1 according to a first embodiment of the present invention is illustrated.

A diesel particulate filter (DPF) 3 is interposed between exhaust pipes 2a, 2b, which constitute an exhaust passage of the diesel engine 1. A diesel oxidation catalyst (DOC) 4 is disposed in the exhaust pipe 2a upstream of the DPF 3. The DPF 3 is a ceramic filter having a publicly known structure. For instance, the DPF 3 is made of heat-resistant ceramics such as cordierite and is formed in the shape of a honeycomb structure. An end of each one of multiple cells of the honeycomb structure as gas passages is blocked alternately on an inlet side or an outlet side of the honeycomb structure. Exhaust gas discharged from the engine 1 flows downstream while passing through porous partition walls of the DPF 3. Meanwhile, particulate matters (PM) contained in the exhaust gas are collected and gradually deposited in the DPF 3.

The DOC 4 has a publicly known structure with an oxidation catalyst supported on a surface of a ceramic catalyst support provided by a cordierite honeycomb structure and the like. The DOC 4 combusts hydrocarbon (HC), which is supplied to the exhaust passage, by catalytic reaction. Thus, the DOC 4 increases temperature of the exhaust gas and temperature of the DPF 3. The DPF 3 may be a metallic filter. An oxidation catalyst may be supported on the DPF 3. Alternatively, the oxidation catalyst need not be supported on the DPF 3. A system structure, in which the DPF 3 supporting the oxidation catalyst is disposed but no DOC 4 is disposed upstream of the DPF 3, may be employed.

An upstream side exhaust gas temperature sensor 51 is disposed between the DOC 4 and the DPF 3 in the exhaust pipe 2a upstream of the DPF 3. A downstream side exhaust gas temperature sensor 52 is disposed downstream of the DPF 3 in the exhaust pipe 2b. The exhaust gas temperature sensors 51, 52 as temperature sensing means are connected to an electronic control unit (ECU) 6. The exhaust gas temperature sensors 51, 52 sense temperature of the exhaust gas entering the DPF 3 (upstream exhaust gas temperature) and temperature of the exhaust gas discharged from the DPF 3 (downstream exhaust gas temperature) and output the temperatures to the ECU 6. An air flow meter 53 as intake air quantity sensing means is disposed in an intake pipe 11 of the engine 1 and outputs an intake air quantity to the ECU 6. An intake throttle valve 12 is disposed downstream of the air flow meter 53 in the intake pipe 11. The intake throttle valve 12 changes the intake air quantity responsive to a command of the ECU 6. The intake throttle valve 12 changes a flow passage area of the intake pipe 11 by changing a valve opening degree. Thus, the intake throttle valve 12 regulates the intake air quantity. An air fuel ratio sensor (an A/F sensor) 54 is disposed in the exhaust pipe 2b downstream of the DPF 3. Instead of the A/F sensor 54, an oxygen sensor may be disposed in the exhaust passage. Alternatively, the A/F sensor 54 and the oxygen sensor may be combined.

The intake pipe 11 of the engine 1 communicates with the exhaust pipe 2a upstream of the DOC 4 through an EGR (exhaust gas recirculation) passage 13 equipped with an EGR control valve 7. The EGR control valve 7 changes an EGR quantity, or a quantity of the exhaust gas recirculated into the intake air through the EGR passage 13, responsive to a command of the ECU 6. For instance, the EGR control valve 7 has a publicly known structure consisting of an electric vacuum quantity regulation valve (EVRV) and a mechanical valve (EGRV). The EGR control valve 7 regulates a vacuum amount applied by a vacuum pump in accordance with control current outputted from the ECU 6, and generates a control negative pressure in a negative pressure chamber. Thus, the EGR control valve 7 controls a valve lifting distance of the mechanical valve.

A differential pressure sensor 8 for sensing a differential pressure across the DPF 3 is connected to the exhaust pipes 2a, 2b in order to measure a quantity of the particulate matters collected and deposited in the DPF 3 (a PM deposition quantity). An end of the differential pressure sensor 8 is connected to the exhaust pipe 2a upstream of the DPF 3 through a pressure introduction pipe 81. The other end of the differential pressure sensor 8 is connected to the exhaust pipe 2b downstream of the DPF 3 through a pressure introduction pipe 82. The differential pressure sensor 8 outputs a signal corresponding to the differential pressure across the DPF 3 to the ECU 6.

Other various types of sensors such as an accelerator position sensor or an engine rotation speed sensor are connected to the ECU 6. The ECU 6 (operating state sensing means) senses an operating state of the engine 1 based on sensing signals outputted from the various sensors and calculates an optimum fuel injection quantity, optimum injection timing, an optimum injection pressure and the like in accordance with the operating state of the engine 1. Thus, the ECU 6 controls the fuel injection into the engine 1 and valve opening degrees of the intake throttle valve 12 and the EGR control valve 7. The ECU 6 performs a post-injection and the like based on the outputs of the sensors to increase the temperature of the DPF 3 above combustion temperature of the particulate matters and to regenerate the DPF 3.

Next, the regeneration of the DPF 3 will be explained. The ECU 6 includes temperature increasing means, deposition quantity estimating means, and regeneration controlling means. The temperature increasing means increases the temperature of the exhaust gas and increases the quantity of the hydrocarbon contained in the exhaust gas to generate reaction heat of the hydrocarbon at the DOC 4. Thus, the temperature increasing means increases the temperature of the DPF 3. The deposition quantity estimating means estimates the PM deposition quantity of the DPF 3. The regeneration controlling means combusts and eliminates the deposited particulate matters by operating the temperature increasing means to increase the temperature of the DPF 3 to proximity of a predetermined target temperature when the PM deposition quantity exceeds a predetermined value.

The deposition quantity estimating means estimates the PM deposition quantity from the differential pressure across the DPF 3 sensed by the differential pressure sensor 8, for instance. The DPF differential pressure increases as the PM deposition quantity increases in the case where a flow rate of the exhaust gas is constant. Therefore, the PM deposition quantity can be estimated by measuring the above relationship beforehand. Alternatively, the PM deposition quantity may be estimated by calculating a discharged quantity of the particulate matters based on engine operating conditions measured based on the outputs of the various sensors and by integrating the discharged quantity. These methods may be combined.

More specifically, a post-injection, addition of the fuel into the exhaust gas from a fuel adding device disposed in the exhaust pipe 2a upstream of the DOC 4, retardation of the fuel injection timing, intake air restriction by the intake throttle valve 12 or the like is used as the temperature increasing means. Intercooler bypassing operation may be performed as the temperature-increasing means if the engine is equipped with an intake air intercooler. Thus, the above operations supply the unburned hydrocarbon into the exhaust passage to generate heat in the oxidation reaction at the DOC 4 or increase the temperature of the exhaust gas discharged from the engine 1. Thus, the high-temperature exhaust gas is supplied to the DPF 3. One of the above operations may be employed or the multiple operations may be combined as the temperature increasing means.

For instance, temperature (the target temperature) necessary to regenerate the DPF 3 is set at a predetermined constant value. The target temperature is set as high as possible (for instance, 600° C.) in a range in which safety can be ensured. Alternatively, the target temperature may be changed in accordance with a quantity of the particulate matters remaining during the temperature increase. In this case, the target temperature should be preferably increased as the quantity of the remaining particulate matters (the PM deposition quantity) decreases. For instance, when the PM deposition quantity exceeds a predetermined value (for instance, 4 g/L), the target temperature is set at 600° C. in order to avoid rapid combustion of the particulate matters. When the FM deposition quantity is equal to or less than the predetermined value (for instance, 4 g/L), the target temperature is set at 650° C. to reduce deterioration of a fuel cost due to the regeneration. Alternatively, the target temperature may be changed in multiple stages.

Figure 2:
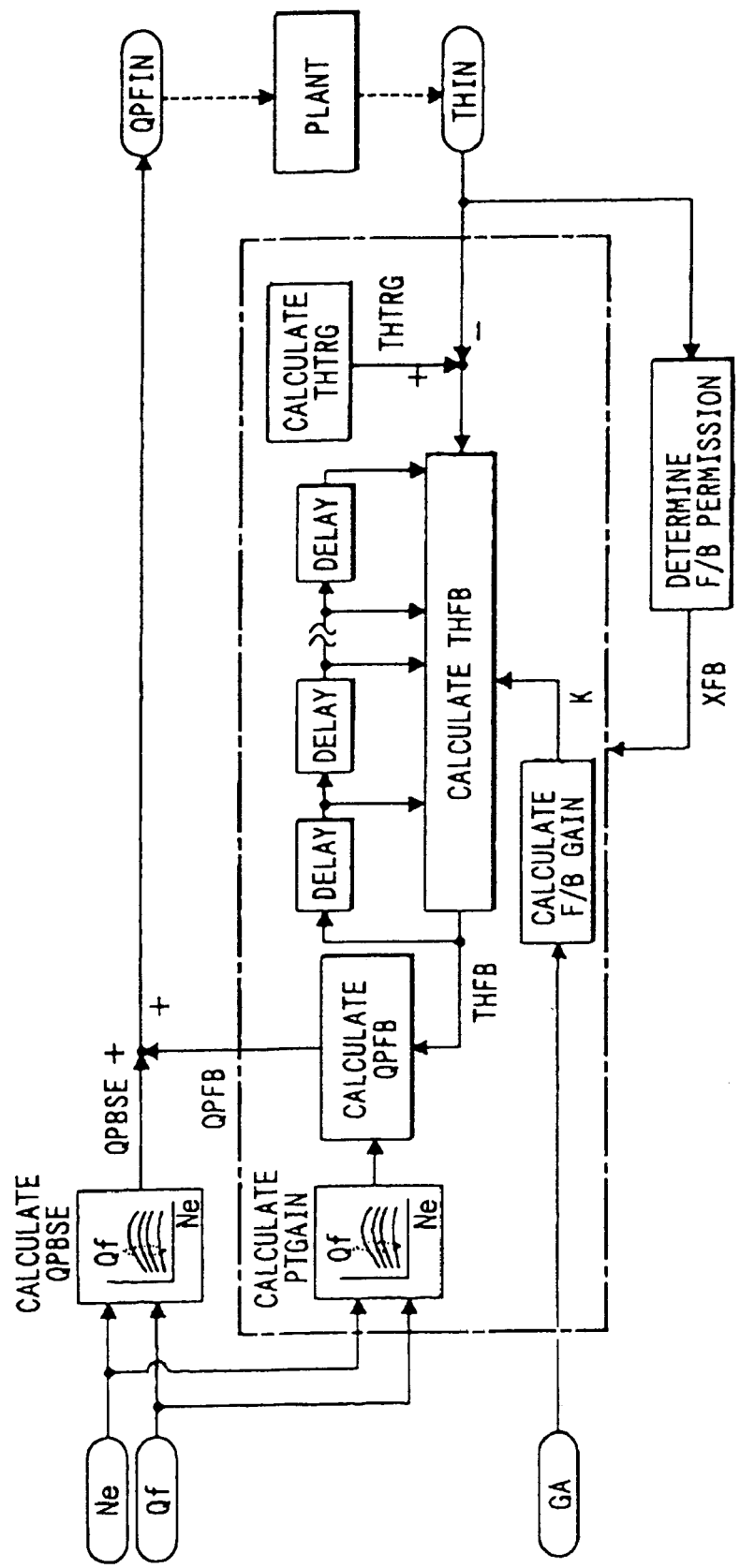
FIG. 2 is a block diagram showing diesel particulate filter temperature control performed by the exhaust gas purification system according to the first embodiment.

Next, a control method of the exhaust gas temperature between the DOC 4 and the DPF 3 in the case where the post-injection is performed as the temperature increasing means in the structure shown in FIG. 1, in which the DOC 4 is disposed upstream of the DPF 3, will be explained based on a block diagram shown in FIG. 2. The regeneration controlling means includes basic operation amount calculating means, feedback gain calculating means and a correction value calculating means. The basic operation amount calculating means calculates a basic post-injection quantity QPBSE corresponding to the present operating state from an engine rotation speed Ne and a required injection quantity Qf. The feedback gain calculating means calculates the F/B gain corresponding to the present operating state from the intake air quantity GA. The correction value calculating means calculates a temperature correction value THFB by using the calculated F/B gain based on a deviation between the upstream exhaust gas temperature THIN and the target temperature THTRG and history of the past correction value. The regeneration controlling means calculates a final post-injection quantity correction value QPFB (a renewed value of the correction value) from the temperature correction value THFB and sensitivity PTGAIN of a temperature change corresponding to the present engine rotation speed Ne and required injection quantity Qf. The regeneration controlling means adds the final post-injection quantity correction value QPFB to the basic post-injection quantity QPBSE. Thus, the regeneration controlling means calculates a final post-injection quantity QPFIN.

Figure 3A:
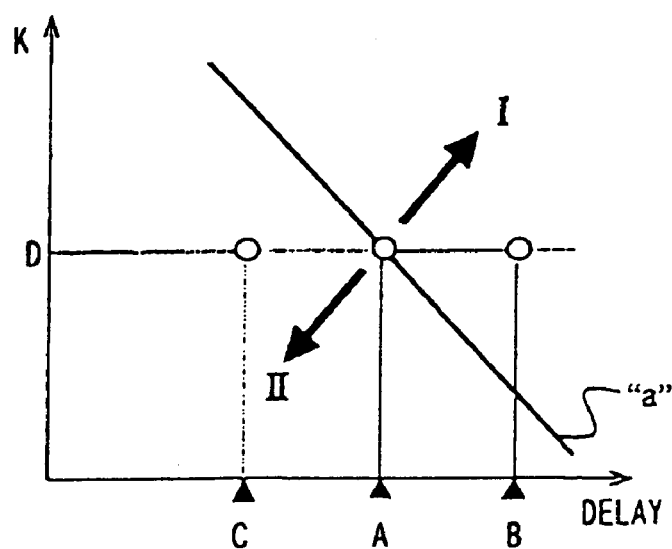
FIG. 3A is a graph showing a relationship between a feedback gain and a delay in an exhaust gas temperature change.
Figure 3B:
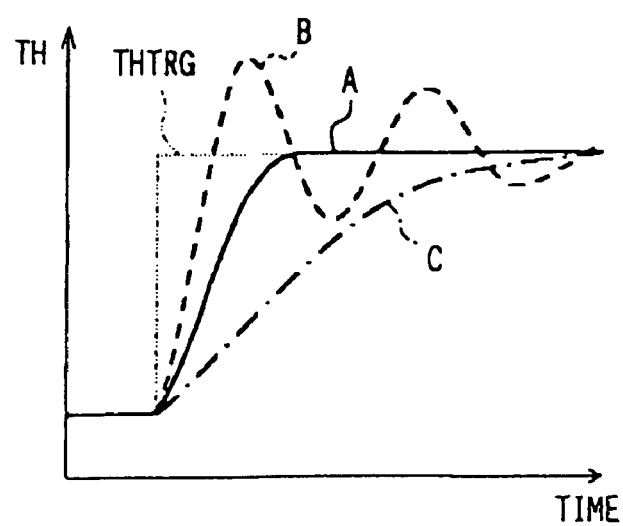
FIG. 3B is a graph showing a relationship between the exhaust gas temperature change and an operating state.

As explained above, the change of the exhaust gas temperature TH delays with respect to the change of the operation amount of the temperature increasing means (the post-injection quantity QPFIN). Therefore, for instance, if the F/B gain is set based on an operating state in which the delay is a value A shown in FIG. 3A, the response of the control system is improved as shown by the broken line B in FIG. 3B in the operating state in which the delay is a large value B. However, the exhaust gas temperature TH vibrates and the stability is deteriorated. Specifically, if the exhaust gas temperature TH overshoots to the higher temperature, there is a possibility that the particulate matters are combusted rapidly and the DPF 3 is damaged. The response is deteriorated in another operation range in which the delay is a small value C as shown by the chained line C in FIG. 3B. Therefore, in the present embodiment, the F/B gain is switched in accordance with the operating state. Thus, the correction value of the temperature increasing means is calculated by using the F/B gain suitable for the present operating state. Thus, the deterioration of the response or the stability due to the deviation of the F/B gain is prevented. The F/B gain is switched in accordance with the degree of the delay in the temperature change.

Figure 4:
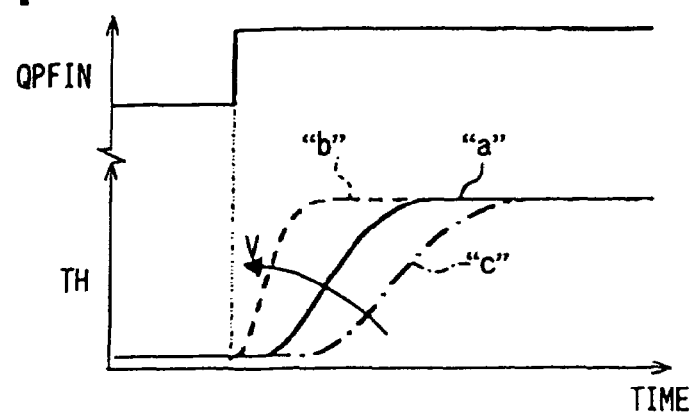
FIG. 4 is a graph showing a relationship between the exhaust gas temperature change and an exhaust gas flow rate.
Figure 5:
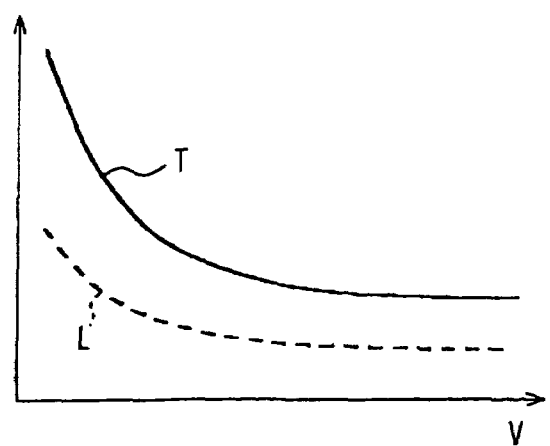
FIG. 5 is a graph showing a relationship between a change in a time constant or a dead time and the exhaust gas flow rate.
Figure 6:
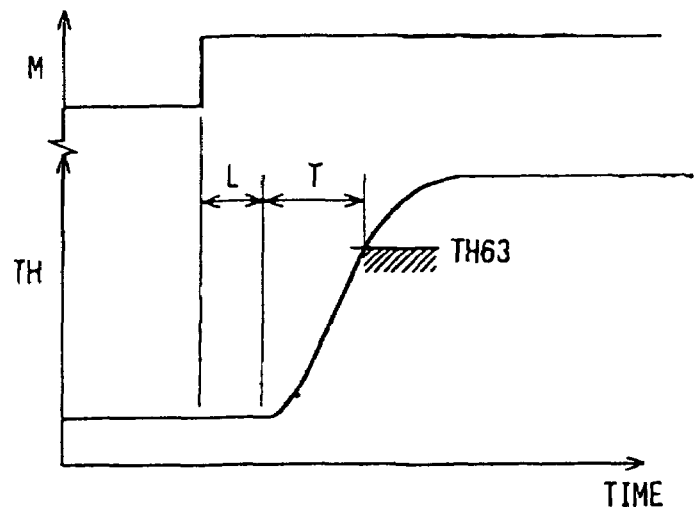
FIG. 6 is a time chart showing a model representing a delay of the exhaust gas change with respect to a temperature increase operation amount by a transfer function.

The delay changes in accordance with the flow rate V of the exhaust gas passing through the DOC 4 or the DPF 3 as shown in FIG. 4. If the exhaust gas flow rate V increases, heat conductivity between the exhaust gas and the DOC 4 or the DPF 3 increases and the delay decreases. If the exhaust gas flow rate V decreases, the delay increases. If the delay of the system is represented by a time constant T and a dead time L as shown in FIG. 6, it can be experimentally ascertained that the exhaust gas flow rate V is dominant over the time constant T and the dead time L as shown in FIG. 5. In FIG. 6, a sign M represents the temperature increase operation amount, and a sign TH63 represents a point where 63% of the target temperature THTRG is achieved. Therefore, the delay under the present operating condition can be determined by measuring the exhaust gas flow rate V. Then, the F/B gain is switched in accordance with the degree of the delay. The exhaust gas flow rate V can be measured based on the intake air quantity GA. Therefore, the intake air quantity GA is measured by the air flow meter 53 disposed in the intake pipe 11, for instance. Then, the F/B gain suitable for the delay determined in accordance with the intake air quantity GA is selected.

More specifically, in the conventional technology, even if the change in the operating condition accompanied by the change in the exhaust gas flow rate occurs, the constant post-injection quantity, which is set before the operating condition changes, is injected. As a result, the increasing speed of the DPF temperature will change. For instance, the DPF temperature is estimated based on the temperature at the outlet of the DPF. In contrast, in the present embodiment, the correction value of the temperature increasing means is calculated as explained above in accordance with the change in the constantly changing operating condition, and the injection is performed while changing the post-injection quantity reflecting the correction value. Thus, the increasing speed of the DPF temperature can be maintained in an aimed state even if the operating condition changes. The F/B gain represents a ratio of a deviation index between an actual value and an aimed value of the DPF temperature to a heat input (for instance, the post-injection quantity) per unit time corresponding to the deviation index.

Figure 7A:
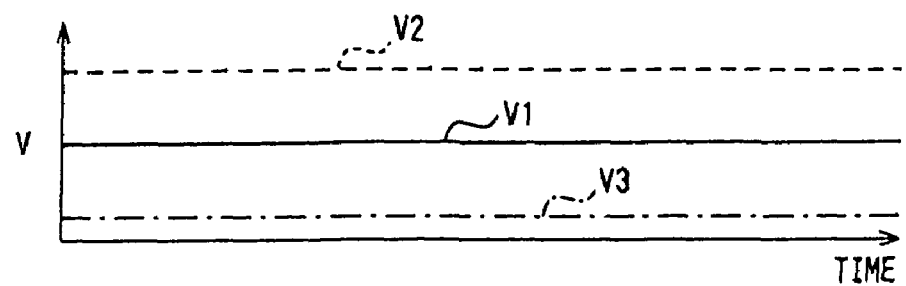
FIG. 7A is a time chart showing the exhaust gas flow rate.
Figure 7B:
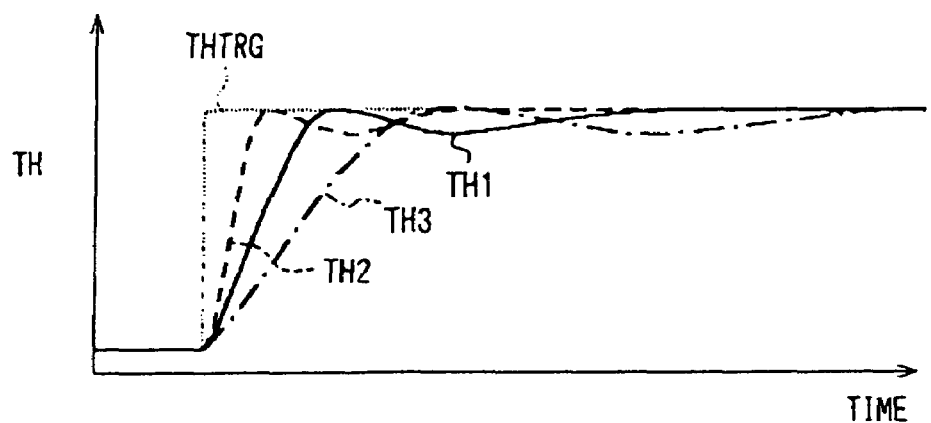
FIG. 7B is a time chart showing the exhaust gas temperature change according to the first embodiment.
Figure 7C:
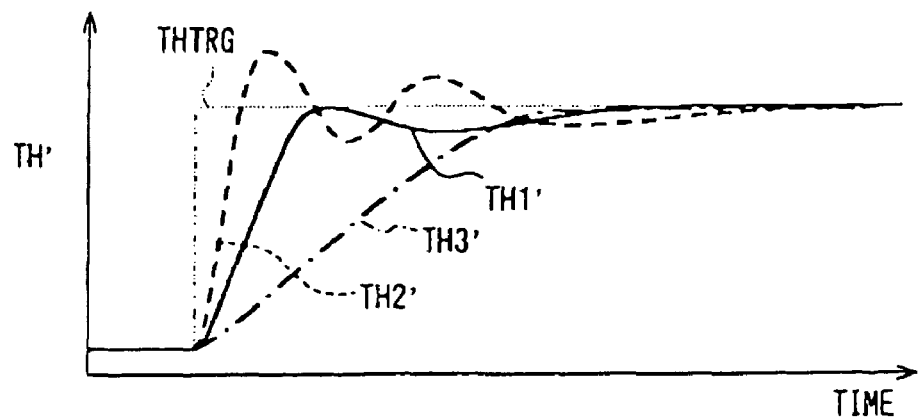
FIG. 7C is a time chart showing the exhaust gas temperature change of a related art.

FIG. 7B shows the temperature control of the present embodiment in the case where F/B gain is switched in accordance with the intake air quantity GA. FIG. 7C shows the temperature control of the related art. FIG. 7B shows changes in the exhaust gas temperature TH in the case where the temperature control of the present embodiment is performed under the multiple operating conditions, in which the exhaust gas flow rates V are different from each other as shown in FIG. 7A. In this control, the F/B gains selected while taking the delays corresponding to the exhaust gas flow rates V1, V2, V3 of the respective operating conditions into consideration are used. FIG. 7C shows changes in the exhaust gas temperature TH' in the case where the similar control (the conventional control) is performed by using a constant F/B gain. In the case of the control method of the related art performing the control with the constant F/B gain, the suitable response and stability can be achieved as shown by a solid line TH1' in FIG. 7C when the exhaust gas flow rate V is a value shown by the solid line V1 in FIG. 7A. However, if the exhaust gas flow rate V is large as shown by a broken line V2 in FIG. 7A, the overshoot increases and the stability near the target temperature THTRG is deteriorated as shown by a broken line TH2' in FIG. 7C. If the exhaust gas flow rate V is small as shown by the chained line V3 in FIG. 7A, it takes a long time for the exhaust gas temperature TH' to converge to the target temperature THTRG as shown by a chained line TH3'. In contrast, in the control method of the present embodiment, which switches the F/B gain for each intake air quantity GA, the increase in the overshoot can be prevented in all the operating conditions as shown by a solid line TH1, a broken line TH2 and a chained line TH3 in FIG. 7B. As a result, the desirable stability can be achieved in all the operating conditions.

A method of calculating the temperature correction value THFB by multiplying the deviation between the sensed exhaust gas temperature THIN and the target temperature (or the integration value or the change of the deviation) by a feedback gain may be employed. Preferably, the history of the past temperature correction value THFB in a predetermined period should be used in addition to the sensed exhaust gas temperature THIN. Thus, the temperature control, of which the response and the stability are improved, can be performed. It is because the temperature change occurring in the future due to the past temperature correction value THFB can be known from the past temperature correction value THFB. Therefore, by calculating the present temperature correction value THFB in accordance with the temperature change, the response and to the stability are improved compared to the controlling method feeding back only the exhaust gas temperature THIN. In order to calculate the past temperature correction value THFB and the F/B gain of the exhaust gas temperature, the relationship of the temperature change with respect to the change of the operation amount of the temperature increasing means is represented by a transfer function. Then, the temperature change is estimated by using the transfer function and reflected in the correction value. This method is state feedback control for feeding back the exhaust gas temperature and the past temperature correction value as state quantities.

Figure 8:
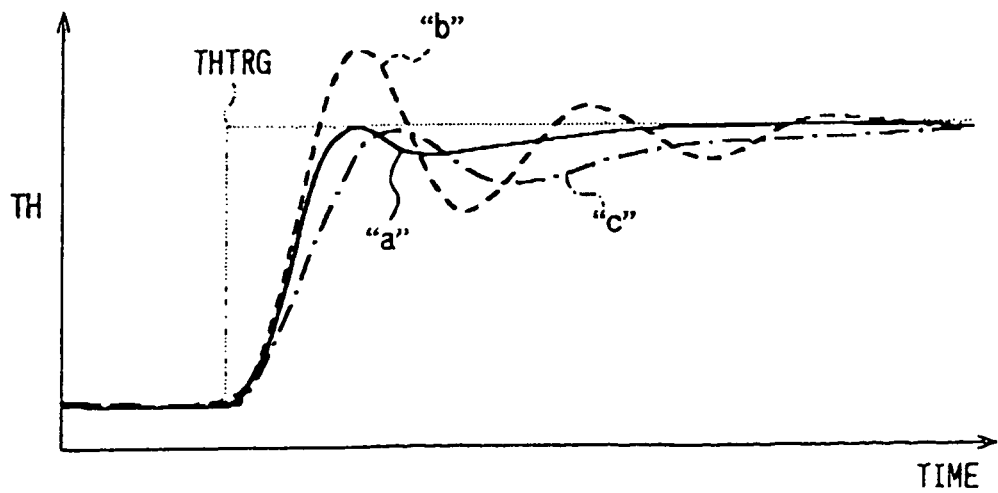
FIG. 8 is a time chart showing the exhaust gas temperature change.

Control results of the temperature control based on the state feedback control and the temperature control (PI control, here) feeding back only the sensed exhaust gas temperature are shown in FIG. 8. As shown in FIG. 8, by performing the state feedback control, suitable response can be obtained as shown by a solid line "a" compared to the case of the PI control using a small F/B gain shown by a chained line "c". In the PI control, even if the response is improved by increasing the F/B gain, the overshoot increases and the stability decreases as shown by a broken line "b" in FIG. B. Therefore, preferably, the state feedback control should be performed to achieve the improvement of the response and the stability at the same time.

More specifically, as shown in FIG. 6, the delay in the change of the exhaust gas temperature TH with respect to the temperature increase operation amount M is modeled by using a transfer function represented by the time constant (a first-order delay) T and the dead time L. Thus, the optimum F/B gain is calculated based on the transfer function. Alternatively, a transfer function represented by a high-order delay may be used. If the transfer function is represented by the high-order delay, model adjustment and arithmetic processing are complicated but the control can be performed more precisely because the delay can be represented precisely.

The temperature correction value THFB is calculated by multiplying the deviation between the upstream exhaust gas temperature THIN and the target temperature THTRG and the past temperature correction value THFB by the calculated F/B gains. In the state feedback control, the relationship between the operation amount change and the exhaust gas temperature change is represented by the transfer function. Therefore, the unique F/B gain for minimizing an evaluation function of the deviation between the operation amount and the target value can be calculated by using the transfer function and by using weights of the response and the stability as parameters. Unlike the PI control, there is no need to adjust the gain by trial and error in the state feedback control. However, in the state feedback control, many iterative calculations are performed to calculate the F/B gain. Therefore, the F/B gains of the respective control models need to be calculated beforehand.

In the calculation of the F/B gain in the state feedback control, a pole placement method may be used. According to the method, the F/B gain can be calculated by four fundamental rules of the arithmetic if the pole of the transfer function of the control system representing the characteristics of the response and the stability of the control system is provided. Thus, a state F/B gain corresponding to the intake air quantity sensed during the travel of the vehicle can be calculated continuously. Thus, the F/B gain suitable for the operating state can be calculated more precisely, and the control accuracy is improved. By changing the F/B gain continuously, erroneous calculation of the correction value at the time when the gain is switched can be prevented.

The effects of the control method of the exhaust gas temperature between the DOC 4 and the DPF 3 in the structure in which the DOC 4 is disposed upstream of the DPF 3 is explained above. Similar effects can be achieved also in the case where the DPF temperature estimated from the operating state, the temperature increase operation amount, the exhaust gas temperature and the like is feedback-controlled in a structure in which the DOC 4 is not provided.

The intake air quantity is dominant over the changes in the parameters (the time constant or the dead time) of the model setting means explained above. In the case of a system in which a unique intake air quantity is determined by the rotation speed and the injection quantity (for instance, a system performing open control of opening degrees of actuators of the intake system such as the intake throttle valve 12, the EGR control valve 7 and a variable nozzle vane), the F/B gain can be calculated by a model based on the rotation speed and the injection quantity.

Next, operation of the ECU 6 of the present embodiment will be explained based on flowcharts and a graph shown in FIGS. 9 to 13.

Figure 9:
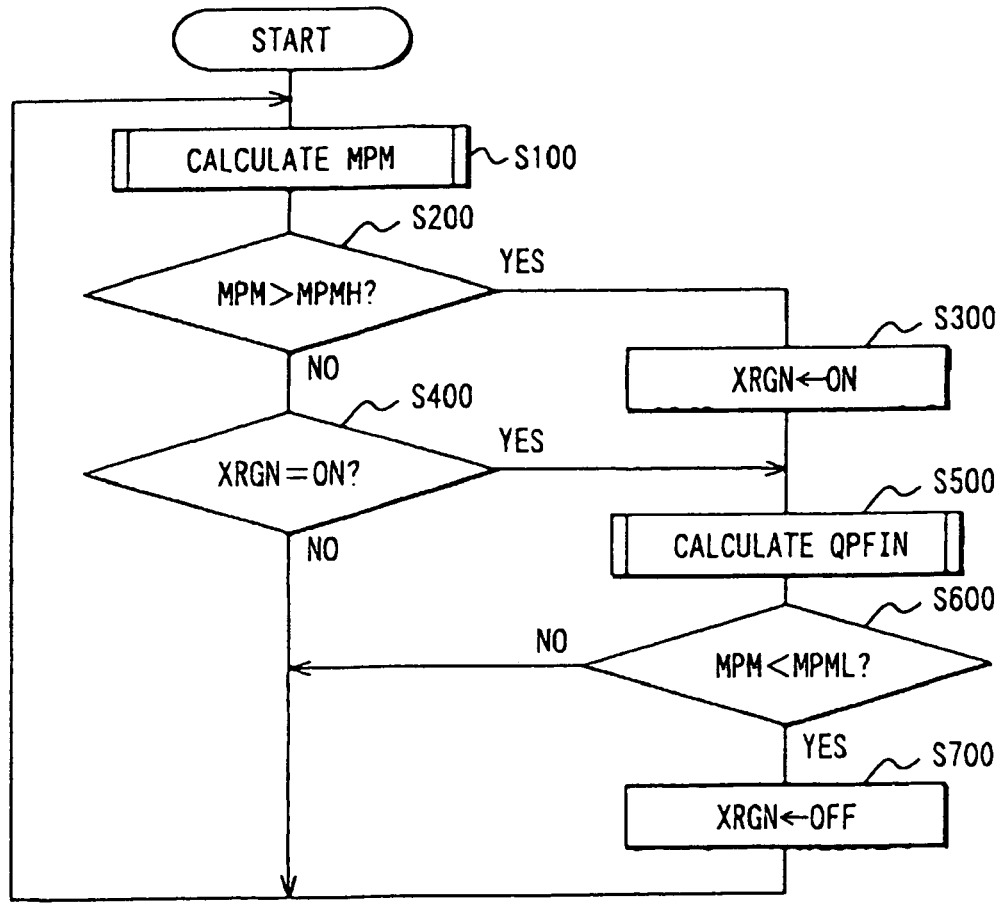
FIG. 9 is a flowchart showing basic operation of diesel particulate filter regeneration performed by an electronic control unit according to the first embodiment.

First, in Step S100 of basic operation shown in FIG. 9 for regenerating the DPF 3, the PM deposition quantity MPM of the DPF 3 is measured. For instance, the relationship between the flow rate of the exhaust gas passing through the DPF 3 and the differential pressure across the DPF 3 changes in accordance with the PM deposition quantity MPM. By using this relationship, the PM deposition quantity MPM is calculated based on the differential pressure sensed by the differential pressure sensor 8, to which the pressures upstream and downstream of the DPF 3 are introduced, and the flow rate of the exhaust gas passing through the DPF 3. Alternatively, the quantity of the particulate matters discharged from the engine 1 under the respective operating conditions may be estimated, and the discharged quantity may be accumulated to calculate the PM deposition quantity MPM.

Then, in Step S200, the PM deposition quantity MPM calculated in Step S100 is compared with a regeneration start PM deposition quantity MPMH (a first predetermined value: for instance, 4 g/L). If the PM deposition quantity MPM is greater than the regeneration start PM deposition quantity MPMH, it is determined that the regeneration of the DPF 3 is necessary, and the ECU 6 proceeds to Step S300. In Step S300, a DPF regeneration flag XRGN is turned on, and the ECU 6 proceeds to Step S500. In Step S500, the regeneration control of the DPF 3 is performed. If the PM deposition quantity MPM is equal to or less than the regeneration start PM deposition quantity MPMR in Step S200, the ECU 6 proceeds to Step S400. In Step S400, it is determined whether the DPF regeneration flag XRGN is on. If the DPF regeneration flag XRGN is on, it is determined that the regeneration is being performed, and the ECU 6 proceeds to Step S500. Thus, the temperature of the DPF 3 is increased in Step S500. If the DPF regeneration flag XRGN is off, the temperature increase of the DPF 3 is not performed.

In Step S500, a post-injection quantity necessary to increase the temperature of the DPF 3 to temperature at which the DPF 3 can be regenerated is calculated. More specifically, in Step S510 of the flowchart of FIG. 10, a basic post-injection quantity QPBSE corresponding to the present operating state is calculated. More specifically, the present engine rotation speed Ne and the fuel injection quantity Qf are inputted, and the basic post-injection quantity QPBSE is calculated by using a basic post-injection quantity QPBSE map, which is prepared beforehand.

In Step S520, target temperature THTRG is calculated. The target temperature THTRG should be preferably set as high as possible in a range below DPF temperature at which the particulate matters are rapidly combusted. The DPF temperature causing the rapid combustion of the particulate matters differs in accordance with the PM deposition quantity. Therefore, the target temperature THTRG may be changed in accordance with the PM deposition quantity MPM. In this case, for instance, the target temperature THTRG is set at relatively high first temperature (for instance, 650° C.) when the PM deposition quantity MPM is less than the first predetermined value (for instance, 4 g/L), and the target temperature THTRG is set at second temperature (for instance, 600° C.) lower than the first temperature (for instance, 650° C.) when the PM deposition quantity MPM exceeds the first predetermined value (for instance, 4 g/L).

In Step S530, a temperature correction value THFB necessary to maintain the present exhaust gas temperature near the target temperature THTRG is calculated. More specifically, in Step S531 of a flowchart of FIG. 13, the DPF upstream exhaust gas temperature THIN is inputted from the output of the upstream side exhaust gas temperature sensor 51 mounted to the exhaust pipe 2a upstream of the DPF 3. In Step S532, the DPF upstream exhaust gas temperature THIN is compared with feedback start temperature KTHSTFB. If the DPF upstream exhaust gas temperature THIN exceeds the feedback start temperature KTHSTFB, the ECU 6 proceeds to Step S534 and performs the feedback control. If the DPF upstream exhaust gas temperature THIN is equal to or lower than the feedback start temperature KTHSTFB, the ECU 6 proceeds to Step S533 and stops the feedback control (THFB=0). The feedback control is stopped in Step S533 to prevent the hydrocarbon, which is not reacted, from passing downward when the reacting quantity of the hydrocarbon decreases due to a decrease in the temperature of the exhaust gas.

Figure 11:
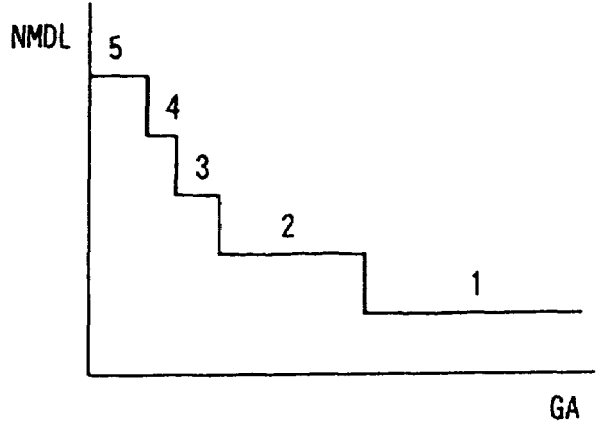
FIG. 11 is a diagram showing a method of setting a control model based on an intake air quantity according to the first embodiment.
Figure 12:
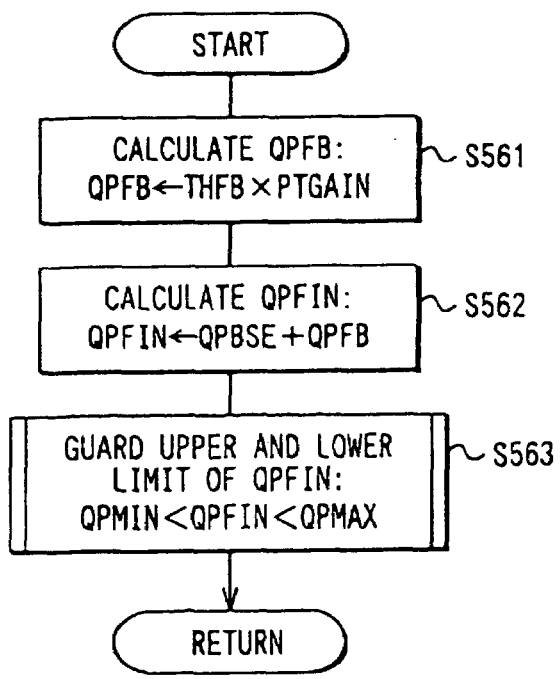
FIG. 12 is a flowchart showing steps for calculating a final post-injection quantity according to the first embodiment.
Figure 13:
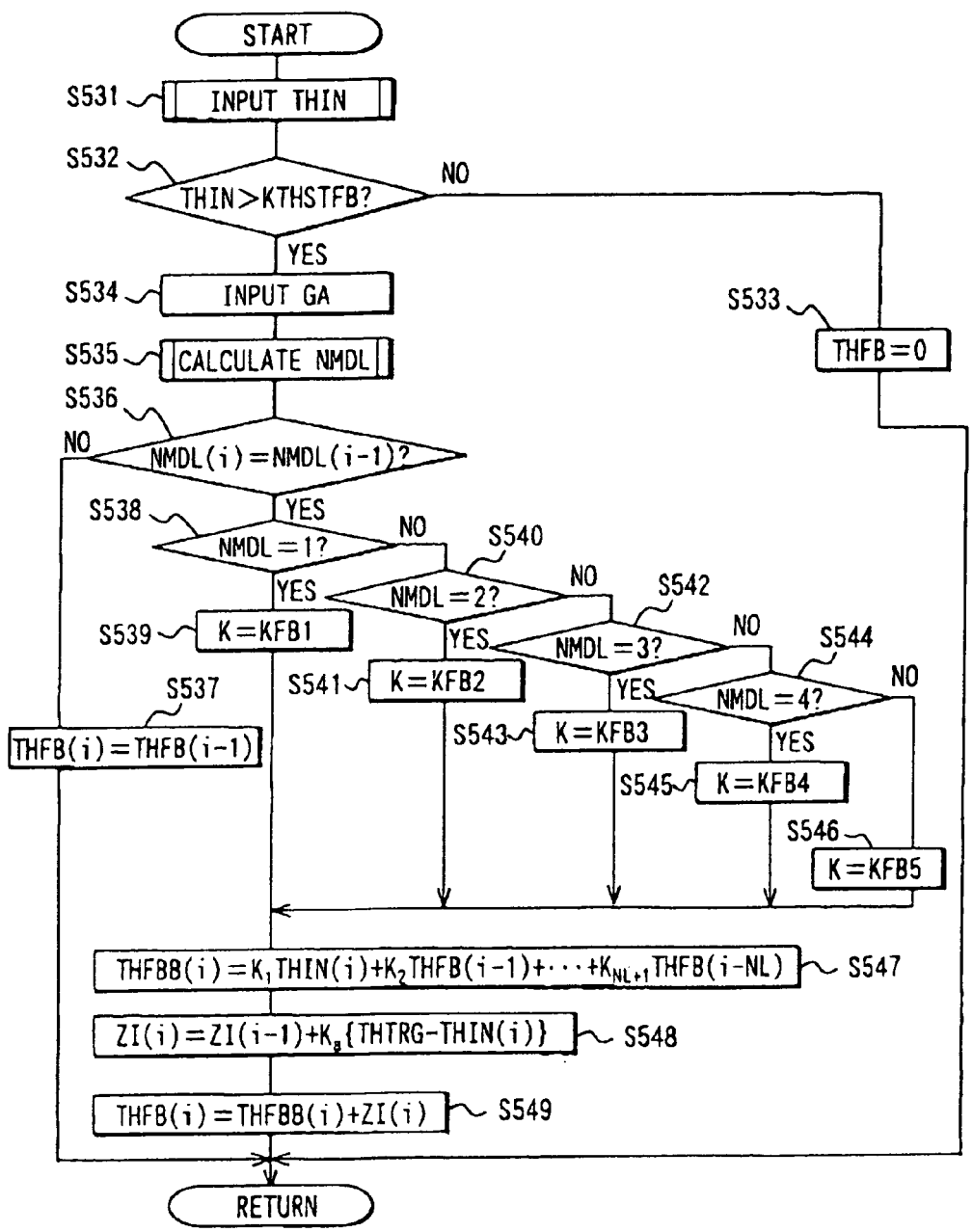
FIG. 13 is a flowchart showing steps for calculating a temperature correction value of temperature increase operation amount according to the first embodiment.

In Step S534, the present intake air quantity GA is inputted from the output of the air flow meter 53 disposed in the intake pipe 11. Then, in Step S535, a control model selection number NMDL is set based on the present intake air quantity GA. For instance, the control model is set in five stages (NMDL=1 to 5) in accordance with the intake air quantity GA as shown in FIG. 11. In Step 5536, it is determined whether a present value NMDL(i) of the control model selection number NMDL is equal to a previous value NMDL(i−1) of the control model selection number NMDL. More specifically, in Step S536, it is determined whether the control model is maintained or switched. If the control model is not switched (NMDL(i)=NMDL(i−1)), the ECU 6 proceeds to Step S538. If the control model is switched, the ECU 6 proceeds to Step S537.

In Step S537, the present value THFB(i) of the temperature correction value is not calculated but the previous value THFB(i−1) of the temperature correction value is held in order to prevent setting errors of the temperature correction value THFB due to erroneous calculation at the time when the control model is switched.

In Steps S538 to S546, it is sequentially determined which one of the control model selection numbers 1 to 5 is selected. In Steps S538 to S546, the control model indicated by the model selection number NMDL is calculated and a F/B gain arrangement K ($K=[K_1, K_2, K_3, \ldots, K_{NL+1}, K_a]$), which is set for adjusting the response and the stability of the control model beforehand, is calculated The F/B gain arrangements KFB1, KFB2, KFB3, KFB4, KFB5 are calculated as the F/B gain arrangements K corresponding to the respective control models. The number of the F/B gains of the F/B gain arrangement K is set at a total number of a waste of the model (time divided by a calculation cycle), one, and another one corresponding to a gain of an integral term.

In following Steps S547 to S549, by using the F/B gain arrangement K calculated in Steps S538 to S546, the temperature correction value THFB is calculated in accordance with the upstream exhaust gas temperature THIN inputted in Step S531, the target temperature THTRG calculated in Step S520 and the temperature correction values THFB(i−1) . . . THFB(i−NL) from the temperature correction value THFB (i−NL), which is obtained at the time preceding the present time by the dead time, to the previous temperature correction value THFB(i−1), based on following formulas (1), (2), and (3). In the formulas (1) to (3), a sign ZI represents an integration correction value, and a sign NL represents a value provided by dividing the dead time by the calculation cycle.

$$THFBB(i)=K_1 THIN(i)+K_2 THFB(i-1)+ \ldots +K_{NL+1} THFB(i-NL), \quad (1)$$

$$ZI(i)=ZI(i-1)+K_a\{THTRG-THIN(i)\}, \quad (2)$$

$$THFB(i)=THFBB(i)+ZI(i), \quad (3)$$

Figure 10:
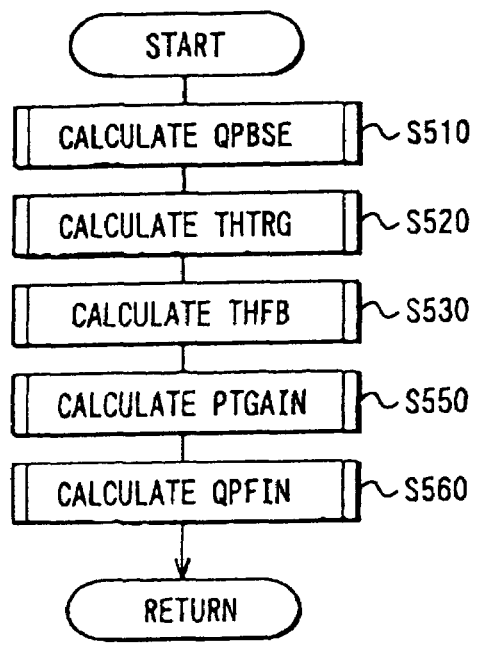
FIG. 10 is a flowchart showing steps for calculating a post-injection quantity according to the first embodiment.

In Step S550 of the flowchart of FIG. 10, a temperature change gain PTGAIN with respect to a post-injection quantity change corresponding to the operating state is calculated. More specifically, first, the present engine rotation speed Ne and the present fuel injection quantity Qf are inputted. Then, the temperature change gain PTGAIN corresponding to the present engine rotation speed Ne and the present fuel injection quantity Qf is calculated by using a temperature change gain PTGAIN map, which is prepared beforehand. Thus, the temperature correction value THFB calculated in a dimension of the temperature (for instance, ° C.) is converted into a value in a dimension of the post-injection quantity (for instance, mm$^3$/st) as the temperature increase operation amount. Thus, the dimension is equalized by using the temperature change gain PTGAIN ((mm$^3$/st)/° C., for instance), and the final correction can be performed.

In Step S560, a post-injection quantity correction value corresponding to the temperature correction value THFB is added to the basic post-injection quantity QPBSE. Thus, a final post-injection quantity QPFIN is calculated. More specifically, in Step S561 of a flowchart of FIG. 12, the temperature correction value THFB is multiplied by the temperature change gain PTGAIN with respect to the temperature correction value. Thus, a post-injection correction value QPFB is calculated. In Step S562, the post-injection correction value QPFB is added to the basic post-injection quantity QPBSE to calculate the final post-injection quantity QPFIN. In Step S563, upper and lower limit guard of the final post-injection quantity QPFIN, which is calculated in Step S562, is performed. More specifically, the final post-injection quantity QPFIN is limited in a range between a minimum final post-injection quantity QPMIN and a maximum final post-injection quantity QPMAX (QPMIN<QPFIN<QPMAX).

In Step S600 of the flowchart of FIG. 9, the PM deposition quantity MPM calculated in Step S100 is compared with a regeneration end PM deposition quantity MPML (a second predetermined value: for instance, 0.5 g/L). If the PM deposition quantity MPM is equal to or less than the regeneration end PM deposition quantity MPML, it is determined that the regeneration is completed, and the ECU 6 proceeds to Step S700. In Step S700, the DPF regeneration flag XRGN is turned off and the regeneration is ended.

(Second Embodiment)

Next, an exhaust gas purification system according to a second embodiment of the present invention will be explained based on FIGS. 14 to 18C.

In the second embodiment, the F/B gains are continuously calculated based on the sensed intake air quantity by using a pole placement method as one of control theories.

Figure 14:
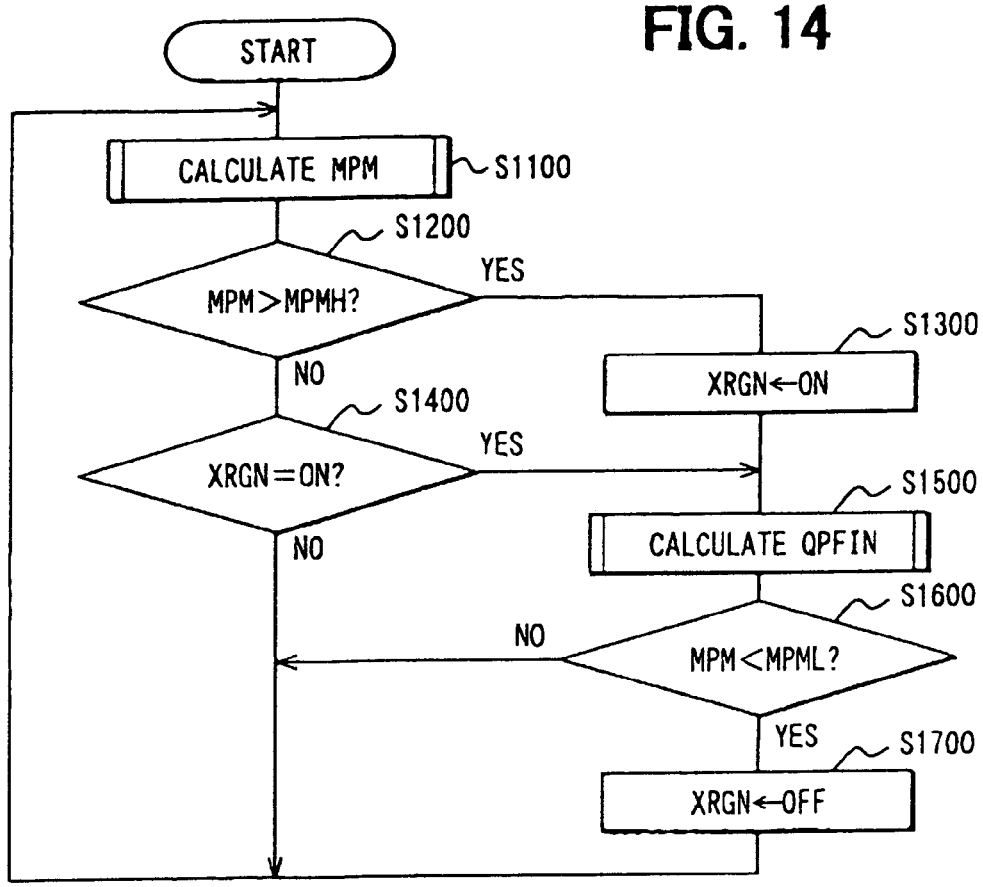
FIG. 14 is a flowchart showing steps of basic operation of diesel particulate filter regeneration performed by an electronic control unit according to a second, embodiment of the present invention.

First, in Step S1100 of a flowchart of FIG. 14, the PM deposition quantity MPM of the DPF 3 is measured. Then, in Step S1200, the PM deposition quantity MPM is compared with the regeneration start PM deposition quantity MPMH (the first predetermined value: for instance, 4 g/L). If the PM deposition quantity calculated in Step S1100 is greater than the regeneration start PM deposition quantity MPMH in Step S1200, it is determined that the regeneration of the DPF 3 is necessary, and the ECU 6 proceeds to Step S1300. In Step S1300, the DPF regeneration flag XRGN is turned on, and the ECU 6 proceeds to Step S1500. In Step S1500, the regeneration control of the DPF 3 is performed. If the PM deposition quantity MPM is equal to or less than the regeneration start PM deposition quantity MPMH in Step S1200, the ECU 6 proceeds to Step S1400 and it is determined whether the DPF regeneration flag XRGN is on or not. If the DPF regeneration flag XRGN is on, it is determined that the regeneration is being performed, and the ECU 6 proceeds to Step S1500. Thus, in Step S1500, the temperature of the CPF 3 is increased. If the XRGN flag is off in Step S1400, the temperature increase of the DPF 3 is not performed.

Figure 15:
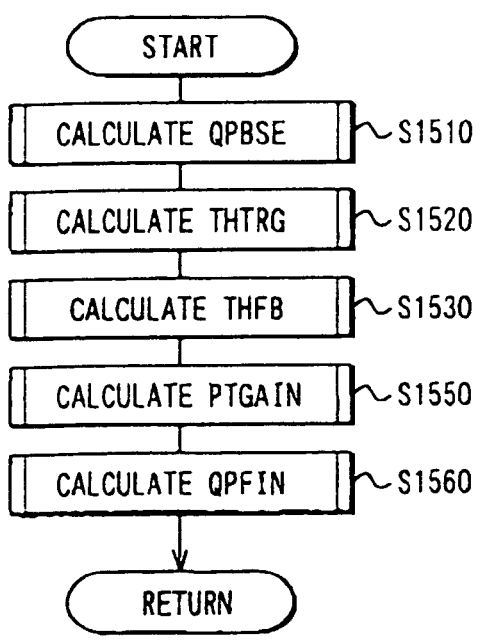
FIG. 15 is a flowchart showing steps for calculating a post-injection quantity according to the second embodiment.

In Step S1500, the post-injection quantity necessary to increase the temperature of the DPF 3 to temperature at which the DPF 3 can be regenerated is calculated based on a flowchart shown in FIG. 15. Steps S1510, S1520 and Steps S1550, S1560 of the flowchart of FIG. 15 correspond to Steps S510, S520 and Steps S550, S560 of the flowchart of FIG. 10 of the first embodiment. First, in Step S1S10, the basic post-injection quantity QPBSE corresponding to the operating state is calculated from the present engine rotation speed Ne and the present fuel injection quantity Qf. Then, in Step S1520, the target temperature THTRG is calculated. The target temperature THTRG should be preferably set as high as possible in a range below temperature at which the particulate matters are combusted rapidly. The target temperature THTRG may be changed in accordance with the PM deposition quantity MPM.

In Step S1530, the temperature correction value THFB necessary to maintain the exhaust gas temperature near the target temperature THTRG. More specifically, in Step S1531 of a flowchart of FIG. 16, the DPF upstream exhaust gas temperature THIN is inputted from the output of the upstream side exhaust gas temperature sensor S1 disposed in the exhaust pipe 2a upstream of the DPF 3. Then, in Step S1532, the DPF upstream exhaust gas temperature THIN is compared with the feedback start temperature KTHSTFB. If the DPF upstream exhaust gas temperature THIN is higher than the feedback start temperature KTHSTFB, the ECU 6 proceeds to Step S1534 and performs the feedback control. If the DPF upstream exhaust gas temperature THIN is equal to or lower than the feedback start temperature KTHSTFB, the ECU 6 proceeds to Step S1533 and stops the feedback control (THFB=0).

Figure 17A:
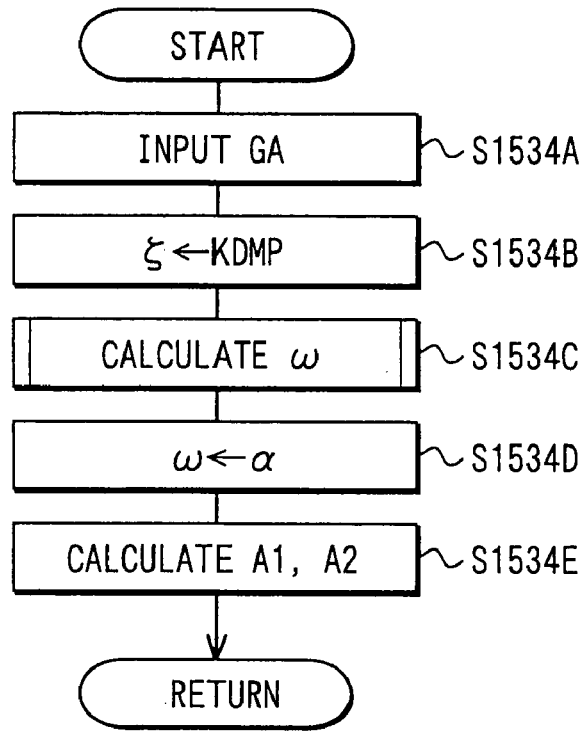
FIG. 17A is a flowchart showing steps for calculating target characteristic multinomial coefficients according to the second embodiment.
Figure 17B:
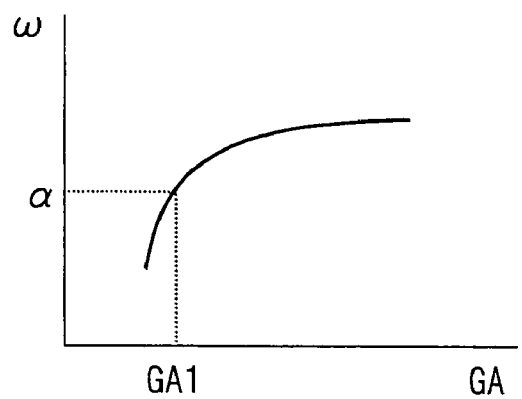
FIG. 17B is a graph showing a relationship between the intake air quantity and an inherent angular frequency according to the second embodiment.
Figure 18A:
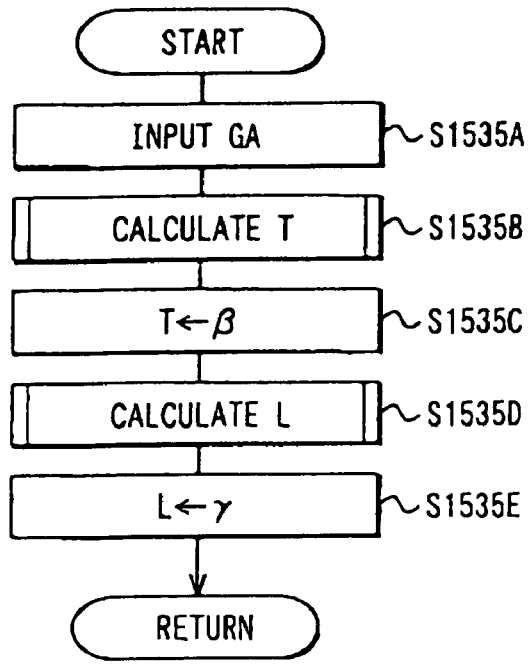
FIG. 18A is a flowchart showing steps for calculating model constants according to the second embodiment.
Figure 18B:
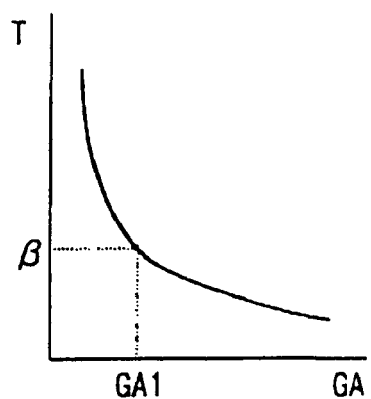
FIG. 18B is a graph showing a relationship between an intake quantity and a time constant of a control model according to the second embodiment.
Figure 18C:
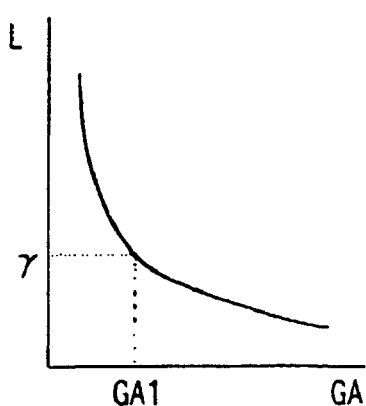
FIG. 18C is a graph showing a relationship between the intake quantity and a dead time of the control model according to the second embodiment.

In Step S1534, target characteristic multinomial coefficients A1, 2 representing the response and the stability of the control system corresponding to the present intake air quantity GA are calculated. A pole of the system can be arbitrarily specified by a damping coefficient $\zeta$ and an inherent angular frequency $\omega$. The pole governs the response and the stability of the system. In this routine, the damping coefficient $\zeta$ and the inherent angular frequency $\omega$ corresponding to the intake air quantity GA are adjusted in advance. Thus, the damping coefficient $\zeta$ and the inherent angular frequency $\omega$ are calculated in accordance with the sensed intake air quantity GA. First, in Step S1534A of a flowchart of FIG. 17A, the present intake air quantity GA is inputted from the output of the air flow meter 53 disposed in the intake pipe 11. Then, in Step S1534B, a predetermined value KDMP is stored as the damping coefficient $\zeta$. Then, in Step S1534C, the inherent angular frequency $\omega$ is calculated. At that time, an inherent angular frequency map, which is prepared in advance based on a relationship shown in FIG. 17B, is used. Thus, a value a corresponding to the inputted intake air quantity GA1 is calculated, and is stored as the inherent angular frequency $\omega$ in Step S1534D.

Then, in Step S1534E, the target characteristic multinomial coefficients A1, A2 as coefficients of a discrete characteristic multinomial ($z^2 + A1 \cdot z + A2$) of the system are calculated from the damping coefficient $\zeta$ and the inherent angular frequency $\omega$ based on following formulas (4) and (5). In the formulas (4), (5), a sign dt represents a calculation cycle.

$$A1 = -2e^{-\zeta \omega dt} \cos(\sqrt{(1-\zeta^2)}\omega dt), \quad (4)$$

$$A2 = (e^{-\zeta \omega dt})^2, \quad (5)$$

In Step S1535, model constants corresponding to the present intake air quantity GA are calculated. More specifically, in Step S1535A of a flowchart of FIG. 18A, the present intake air quantity GA is inputted. Then, by using a time constant map, which is prepared based on a relationship shown in FIG. 18B in advance, a value $\beta$ corresponding to the inputted intake air quantity GA1 is calculated in Step S1535B and stored as the time constant T in Step S1535C. Then, by using a dead time map, which is prepared in advance based on a relationship shown in FIG. 18C, a value $\gamma$ corresponding to the intake air quantity GA1 is calculated in Step S1535D and stored as the dead time L in Step S1535E.

Figure 16:
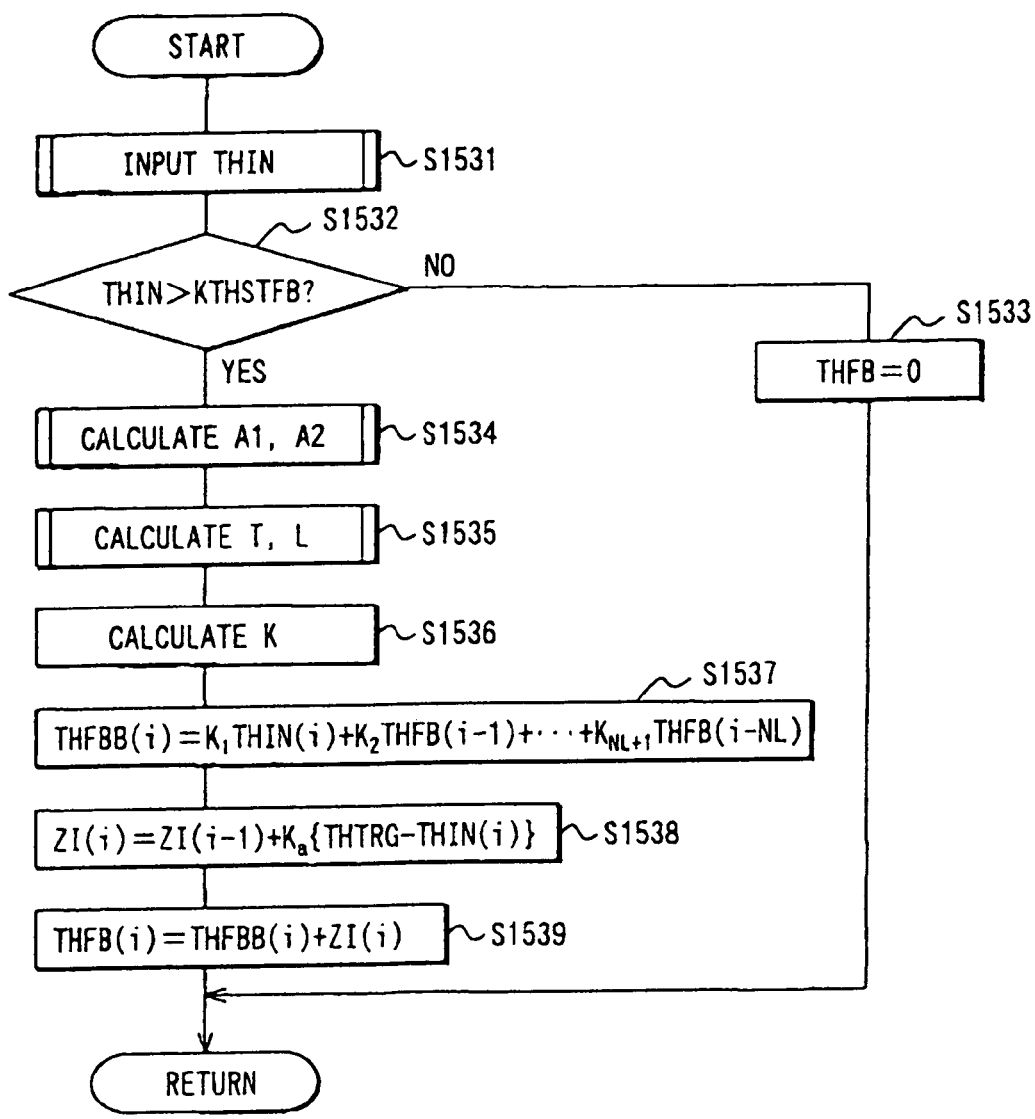
FIG. 16 is a flowchart showing steps for calculating a temperature correction value of temperature increase operation amount according to the second embodiment.

In Step S1536 of the flowchart of FIG. 16, a F/B gain arrangement K [$K_1, K_2, K_3, \ldots, K_{NL-1}, K_a$; (NL; L/dt)], is calculated based on the above calculated target characteristic multinomial coefficients A1, A2, the time constant T and the dead time L. The F/B gain arrangement K achieves target characteristics (the response and the stability) of the system specified by the damping coefficient $\zeta$ and the inherent angular frequency $\omega$. The calculation of the F/B gains by this method does not require the iterative calculation unlike the method of the first embodiment but can be performed by the simple four fundamental rules of the arithmetic. Accordingly, the calculation of the F/B gains of the second embodiment can be performed by the ECU 6 anytime. Therefore, the F/B gains suitable to the present operating condition can be calculated continuously.

In following Steps S1537 to S1539, by using the F/B gain arrangement K calculated in Step S1536, the temperature correction value THFB is calculated in accordance with the upstream exhaust gas temperature THIN inputted in S1531, the target temperature THTRG calculated in Steps S1520 and the temperature correction values THFB(i-1) ... THFB(i-NL) from the temperature correction value THFB (i-NL), which is obtained at the time preceding the present time by the dead time, to the previous temperature correction value THFB(i−1), based on following formulas (6), (7), and (8). A sign ZI in the formulas (6), (7) and (8) represents an integration correction value.

$$THFBB(i)=K_1THIN(i)+K_2THFB(i-1)+\ldots+K_{NL+1}THFB(i-NL), \quad (6)$$

$$ZI(i)=ZI(i-1)+K_a\{THTRG-THIN(i)\}, \quad (7)$$

$$THFB(i)=THFBB(i)+ZI(i), \quad (8)$$

In Step S1550 of the flowchart of FIG. 15, the temperature change gain PTGAIN with respect to the post-injection quantity change corresponding to the operating state is calculated. In Step S1560, the post-injection quantity correction value corresponding to the temperature correction value THGB is added to the basic post-injection quantity QPBSE. Thus, the final post-injection quantity QPFIN is calculated.

In Step S1600 of the flowchart of FIG. 14, the PM deposition quantity MPM calculated in Step S1100 is compared with the regeneration end PM deposition quantity MPML (the second predetermined value: for instance, 0.5 g/L). If the PM deposition quantity MPM is equal to or less than the regeneration end PM deposition quantity MPML, it is determined that the regeneration is completed, and the ECU 6 proceeds to Step S1700. In Step S1700, the DPF regeneration flag XRGN is turned off and the regeneration is ended.

The present invention should not be limited to the disclosed embodiments, but may be implemented in many other ways without departing from the spirit of the invention.

What is claimed is:

1. An exhaust gas purification system of an internal combustion engine, the exhaust gas purification system comprising:
   a particulate filter disposed in an exhaust pipe of the engine;
   temperature increasing means for increasing temperature of the particulate filter;
   operating state sensing means for sensing an operating state of the engine;
   temperature sensing means for sensing the temperature of the particulate filter;
   deposition quantity estimating means for estimating a deposition quantity of particulate matters deposited on the particulate filter; and
   regeneration controlling means for operating the temperature increasing means to increase the temperature of the particulate filter to proximity of a predetermined target temperature when an output of the deposition quantity estimating means exceeds a predetermined value, whereby the particulate matters deposited on the particulate filter are combusted and eliminated, wherein
   the regeneration controlling means includes:
      basic operation amount calculating means for calculating a basic operation amount of the temperature increasing means;
      feedback gain calculating means for calculating a feedback gain corresponding to each degree of a delay in a change of exhaust gas temperature with respect to a change of the operation amount of the temperature increasing means based on an output of the operating state sensing means; and
      correction value calculating means for calculating a correction value of the operation amount of the temperature increasing means by multiplying a deviation between the output of the temperature sensing means and the target temperature by the feedback gain.

2. The exhaust gas purification system as in claim 1, wherein the correction value calculating means calculates a renewed value of the correction value by multiplying at least one of the output of the temperature sensing means, multiple past outputs of the temperature sensing means, a past correction value of the operation amount of the temperature increasing means and multiple past correction values of the operation amount of the temperature increasing means, by the feedback gain.

3. The exhaust gas purification system as in claim 1, wherein
   the correction value calculating means calculates the correction value by additionally multiplying at least one of an integration value of the deviation and a change in the deviation, by the feedback gain.

4. The exhaust gas purification system as in claim 1, wherein
   the operating state sensing means is intake air quantity sensing means for sensing an intake air quantity, and
   the feedback gain calculating means changes the feedback gain in accordance with an output of the intake air quantity sensing means.

5. The exhaust gas purification system as in claim 4, wherein
   the feedback gain calculating means switches the feedback gain among multiple feedback gains, which are calculated and stored beforehand, or changes the feedback gain continuously.

6. The exhaust gas purification system as in claim 1, wherein
   the operating state sensing means senses a rotation speed and a required injection quantity of the engine, and
   the feedback gain calculating means changes the feedback gain in accordance with the rotation speed and the required injection quantity of the engine.

7. The exhaust gas purification system as in claim 6, wherein
   the feedback gain calculating mans switches the feedback gain among multiple feedback gains, which are calculated and stored beforehand, or changes the feedback gain continuously.

8. The exhaust gas purification system as in claim 1, wherein
   the correction value calculating means calculates a renewed value of the correction value by multiplying a present output or multiple past outputs of the temperature sensing means and multiple past correction values of the operation amount of the temperature increasing means by the feedback gain.

9. An exhaust gas purification system of an internal combustion engine, the exhaust gas purification system comprising:
   a particulate filter disposed in an exhaust pipe of the engine;
   temperature increasing means for increasing temperature of the particulate filter;
   operating state sensing means for sensing an operating state of the engine;
   temperature sensing means for sensing the temperature of the particulate filter;
   deposition quantity estimating means for estimating a deposition quantity of particulate matters deposited on the particulate filter; and regeneration controlling means for operating the temperature increasing means to increase the temperature of the particulate filter to proximity of a predetermined target temperature when an output of the deposition quantity estimating means exceeds a predetermined value, whereby the particulate matters deposited on the particulate filter are combusted and eliminated, wherein the regeneration controlling means includes:

basic operation amount calculating means for calculating a basic operation amount of the temperature increasing means;

feedback gain calculating means for calculating a feedback gain corresponding to a delay in a change of exhaust gas temperature with respect to a change of the operation amount of the temperature increasing means based on an output of the operating state sensing means; and correction value calculating means for calculating a correction value of the operation amount of the temperature increasing means based on the feedback gain calculated by the feedback gain calculating means and the output of the temperature sensing means:

wherein the correction value calculating means calculates a renewed value of the correction value by multiplying at least one of the output of the temperature sensing means, multiple past outputs of the temperature sensing means, a past correction value of the operation amount of the temperature increasing means and multiple past correction values of the operation amount of the temperature increasing means, by the feedback gain;

the regeneration controlling means includes model setting means for representing the delay in the change of the exhaust gas temperature with respect to the change of the operation amount of the temperature increasing means by using a transfer function, and the feedback gain calculating means calculates an optimum feedback gain corresponding to the operating state based on the transfer function set by the model setting means.

10. The exhaust gas purification system as in claim 9, wherein the model setting means represents the delay as a transfer function represented by a dead time and a time constant or a transfer function represented by a high-order delay.

11. A method of purifying exhaust gas of an internal combustion engine, the method comprising:

disposing a particulate filter in an exhaust pipe of the engine;

increasing temperature of the particulate filter;

sensing an operating state of the engine;

sensing the temperature of the particulate filter;

estimating a deposition quantity of particulate matters deposited on the particulate filter; and controlling regeneration by controlling the increasing of the temperature of the particulate filter to proximity of a predetermined target temperature when the estimated deposition quantity exceeds a predetermined value, whereby the particulate matters deposited on the particulate filter are combusted and eliminated, and wherein controlling regeneration includes:

calculating a basic operation amount for increasing the temperature of the particulate filter;

calculating a feedback gain corresponding to each degree of a delay in a change of exhaust gas temperature with respect to a change of the operation amount for increasing the temperature based on the sensed operating state; and calculating a correction value of the operation amount for increasing the temperature by multiplying a deviation between the sensed temperature of the particulate filter and the target temperature by the feedback gain.

12. The method as in claim 11, wherein a renewed value of the correction value is calculated by multiplying a sensed temperature of the particulate filter, multiple past sensed temperatures of the particulate filter, a past correction value of the operation amount for increasing the temperature, and/or multiple past correction values of the operation amount for increasing the temperature, by the feedback gain.

13. The method as in claim 11, wherein the correction value is calculated by additionally multiplying an integration value of the deviation and/or a change in the deviation, by the feedback gain.

14. The method as in claim 11, wherein the operating state of the engine is an intake air quantity, and the feedback gain is changed in accordance with the intake air quantity.

15. The method as in claim 14, wherein the feedback gain is switched among multiple feedback gains, which are calculated and stored beforehand, or the feedback gain is changed continuously.

16. The method as in claim 11, wherein the operating state of the engine is an a rotation speed and a required injection quantity of the engine, and the feedback gain is changed in accordance with the rotation speed and the required injection quantity of the engine.

17. The method as in claim 16, wherein the feedback gain is switched among multiple feedback gains, which are calculated and stored beforehand, or the feedback gain is changed continuously.

18. The method as in claim 11, wherein a renewed value of the correction value is calculated by multiplying a present or multiple past sensed temperatures of the particulate filter and multiple correction values of the operation amount of the temperature increase by the feedback gain.

19. A method of purifying exhaust gas of an internal combustion engine, the method comprising:

disposing a particulate filter in an exhaust pipe of the engine;

increasing temperature of the particulate filter;

sensing an operating state of the engine;

sensing the temperature of the particulate filter;

estimating a deposition quantity of particulate matters deposited on the particulate filter; and controlling regeneration by controlling the increasing of the temperature of the particulate filter to proximity of a predetermined target temperature when the estimated deposition quantity exceeds a predetermined value, whereby the particulate matters deposited on the particulate filter are combusted and eliminated, and wherein controlling regeneration includes:

calculating a basic operation amount for increasing the temperature of the particulate filter;

calculating a feedback gain corresponding to a delay in a change of exhaust gas temperature with respect to a change of the operation amount for increasing the temperature based on the sensed operating state; and calculating a correction value of the operation amount for increasing the temperature based on the calculated feedback gain and the sensed temperature of the particulate filter; and representing the delay in the change of the exhaust gas temperature with respect to the change of the operation amount for increasing the temperature by using a transfer function, and an optimum feedback gain is calculated corresponding to the operating state based on the transfer function.

20. The method as in claim 19, wherein the delay is represented as a transfer function represented by a dead time and a time constant or a transfer function represented by a high-order delay.

* * * * *